(12) United States Patent
Niekrasz

(10) Patent No.: US 11,018,885 B2
(45) Date of Patent: May 25, 2021

(54) SUMMARIZATION SYSTEM

(71) Applicant: SRI International, Menlo Park, CA (US)

(72) Inventor: John Niekrasz, Bonita, CA (US)

(73) Assignee: SRI International, Menlo Park, CA (US)

( * ) Notice: Subject to any disclaimer, the term of this patent is extended or adjusted under 35 U.S.C. 154(b) by 25 days.

(21) Appl. No.: 16/387,325

(22) Filed: Apr. 17, 2019

(65) Prior Publication Data

US 2019/0327103 A1 Oct. 24, 2019

Related U.S. Application Data

(60) Provisional application No. 62/659,963, filed on Apr. 19, 2018, provisional application No. 62/662,169, filed on Apr. 24, 2018.

(51) Int. Cl.
*H04L 12/18* (2006.01)
*G06F 16/34* (2019.01)
*G10L 15/26* (2006.01)

(52) U.S. Cl.
CPC ........ *H04L 12/1831* (2013.01); *G06F 16/345* (2019.01); *G10L 15/26* (2013.01)

(58) Field of Classification Search
CPC .... H04L 12/1831; G10L 15/26; G06F 16/345
USPC ........................................................ 715/245
See application file for complete search history.

(56) References Cited

U.S. PATENT DOCUMENTS

| 6,119,147 | A | 9/2000 | Toomey et al. | |
| 9,473,742 | B2 * | 10/2016 | Griffin | H04M 3/567 |
| 10,334,384 | B2 * | 6/2019 | Sun | H04M 3/568 |
| 10,567,185 | B2 * | 2/2020 | Cartwright | H04L 65/605 |

(Continued)

FOREIGN PATENT DOCUMENTS

| EP | 2665023 A1 | 11/2013 |
| WO | 2017/184204 A1 | 10/2017 |

OTHER PUBLICATIONS

Chen et al., Sequence Synopsis: Optimize Visual Summary of Temporal Event Data, IEEE 2018, pp. 45-55. (Year: 2018).*

(Continued)

*Primary Examiner* — William D Titcomb
(74) *Attorney, Agent, or Firm* — Shumaker & Sieffert, P.A

(57) ABSTRACT

In general, the disclosure describes techniques for automatically generating summaries of meetings. A computing system obtains a transcript of a meeting and may produce, based on the transcript of the meeting, a data structure that comprises utterance features. Furthermore, the computing system may determine, based on the transcript of the meeting, temporal bounds of a plurality of activity episodes within the meeting. For each respective activity episode of a plurality of activity episodes, the computing system may determine, based on the utterance features associated with the respective activity episode, a conversational activity type associated with the respective activity episode. Additionally, the computing system may produce an episode summary for the respective activity episode that is dependent on the determined conversational activity type associated with the respective activity episode. The episode summary for the respective activity episode summarizes a conversational activity that occurred during the respective activity episode.

20 Claims, 7 Drawing Sheets

(56) References Cited

U.S. PATENT DOCUMENTS

| | | | |
|---|---|---|---|
| 10,645,035 B2 | 5/2020 | Nowak-Przygodzki et al. | |
| 2004/0114541 A1 | 6/2004 | Caspi et al. | |
| 2004/0230655 A1 | 11/2004 | Li et al. | |
| 2004/0246331 A1 | 12/2004 | Caspi et al. | |
| 2005/0021334 A1* | 1/2005 | Iwahashi | G10L 15/22 704/240 |
| 2012/0166921 A1* | 6/2012 | Alexandrov | H04L 65/4015 715/202 |
| 2012/0290289 A1* | 11/2012 | Manera | G06F 16/345 704/9 |
| 2013/0191452 A1 | 7/2013 | Beerse et al. | |
| 2013/0325972 A1 | 12/2013 | Boston et al. | |
| 2015/0019537 A1* | 1/2015 | Neels | G06F 16/26 707/722 |
| 2015/0348538 A1 | 12/2015 | Donaldson | |
| 2016/0027442 A1 | 1/2016 | Burton et al. | |
| 2016/0253415 A1* | 9/2016 | Zhong | G06F 16/24565 707/722 |
| 2018/0077099 A1 | 3/2018 | Silva et al. | |
| 2018/0122383 A1 | 5/2018 | Raanani et al. | |
| 2018/0137402 A1 | 5/2018 | Bar et al. | |
| 2018/0213013 A1* | 7/2018 | Adams | H04L 65/403 |
| 2018/0227339 A1* | 8/2018 | Rodriguez | H04L 65/1089 |
| 2018/0293304 A1* | 10/2018 | Miller | G06F 16/319 |
| 2018/0293308 A1* | 10/2018 | Miller | G06T 11/206 |
| 2018/0331842 A1* | 11/2018 | Faulkner | H04N 7/15 |
| 2018/0336902 A1* | 11/2018 | Cartwright | G10L 17/02 |
| 2019/0028520 A1 | 1/2019 | Nawrocki | |
| 2019/0034767 A1 | 1/2019 | Sainani et al. | |
| 2019/0108834 A1* | 4/2019 | Nelson | G10L 15/22 |
| 2019/0130917 A1* | 5/2019 | Pogorelik | G10L 17/005 |
| 2019/0132265 A1* | 5/2019 | Nowak-Przygodzki | H04M 3/4936 |
| 2019/0147367 A1 | 5/2019 | Bellamy et al. | |
| 2019/0171760 A1* | 6/2019 | Ikeda | G10L 15/26 |
| 2019/0294999 A1 | 9/2019 | Guttmann | |
| 2019/0295041 A1 | 9/2019 | Sim et al. | |
| 2019/0297126 A1 | 9/2019 | Graziano et al. | |
| 2019/0379742 A1* | 12/2019 | Simpkinson | G06F 3/01 |
| 2019/0384813 A1 | 12/2019 | Mahmoud | |
| 2019/0384854 A1 | 12/2019 | Mahmoud | |

OTHER PUBLICATIONS

"The Stanford Parser: A Statistical Parser," retrieved from https://nlp.stanford.edu/software/lex-parser, Apr. 10, 2019, 15 pp.

Burger et al., "The ISL Meeting Corpus: The impact of meeting type on speech style." In proceedings of the 7th International Conference on Spoken Language Processing, ICSLP2002, Sep. 2002, 4 pp.

Freitag, "Trained Named Entity Recognition Using Distributional Clusters," Proceedings of the 2004 Conference on Empirical Methods in natural language Processing, (EMNLP), Jul. 2004, 8 pp.

Mihalcea et al., "TextRank: Bringing Order into Texts," retrieved from https://www.aclweb.org/anthology/W04-3252, 2004, 8 pp. (Applicant points out, in accordance with MPEP 609.04(a), that the year of publication, 2004, is sufficiently earlier than the effective U.S. filing date, so that the particular month of publication is not in issue.).

U.S. Appl. No. 16/365,439, filed Mar. 26, 2019, naming inventors Ramamurthy et al.

* cited by examiner

COMMITMENT SUMMARY

Assigned to: Harry

Commitment: Send Sarah email about travel

(agreed at: 10:34, Wed., 5 June 2007, by: Harry, Sarah)

[click here to review recording]

FIG. 2

SUMMARIZATION SYSTEM

This application claims the benefit of U.S. Provisional Patent Application 62/659,963, filed Apr. 19, 2018, and U.S. Provisional Patent Application 62/662,169, filed Apr. 24, 2018, the entire content of each of which is incorporated herein by reference.

TECHNICAL FIELD

This disclosure relates to computing systems and, more specifically, to computing systems for generating meeting summaries.

BACKGROUND

Multiple participants engage with one another by way of a meeting to exchange information, directives, ideas, tasks, and so forth. Using voice recognition technology, computing systems can generate a verbatim (or near-verbatim) transcript of the words uttered by participants in a meeting, such as by processing an audio recording or live stream of the meeting. As a result, anyone interested in the contents of the meeting can review the transcript, which is typically more readily and quickly comprehensible than the audio recording or live stream of the meeting.

SUMMARY

In general, this disclosure describes techniques for generating a summary of a meeting. In this disclosure, a "meeting" may refer to spoken exchanges between two or more people and also spoken monologue, such as a speech or presentation, given by a single participant. The meeting summary may include episode summaries that each represents a summary of an episode within the meeting. An episode may include a set of utterances within the meeting that relate to a single matter, where that matter can include, e.g., an introduction, an agenda, an action item or task, an explanation, an overall summary, or another type of episode.

The techniques of this disclosure involve one or more technical improvements to voice recognition and dictation-related technologies that provide at least one practical application. For example, a computing system as described herein may implement an automated system that produces conversation summaries automatically using an abstractive summarization method. The system may produce summaries of decisions, action items, and other important conversational actions and outcomes, and distribute these to users. The system may associate important factual details with each summary, including links to relevant portions of the conversation recording. The system may then make the summaries available to late-comers or absentees who want to know what happened, or participants themselves who need a reminder of key outcomes. The system may produce abstractive summaries by first digesting the expressed meanings of the conversation (i.e., understanding its "content"), distilling this into its essential parts, and then generating new language to describe those essential pieces of the conversation.

As described herein, the automated system targets the communicative activities within a meeting, such as a conversation. It is recognized that spoken communication can typically be broken into episodes (usually in the order of 30 seconds to 10 minutes long). The automated system of this disclosure may identify the temporal bounds of these episodes, identify the activity type of each of the episodes, and may then apply a type-specific summarization process to each episode. There may be several benefits associated with this type of approach. For example, determining conversational activity types and producing an episode summary for an episode based on the determined conversational activity type may produce episode summaries that more accurately and/or concisely expresses and accords with the intent(s) of the participant(s) in the episode.

In some examples, this disclosure describes a method for automatically generating summaries of meetings, the method comprising: obtaining, by a computing system, a transcript of a meeting; producing, by the computing system, based on the transcript of the meeting, a data structure that comprises utterance features; determining, by the computing system, based on the transcript of the meeting, temporal bounds of a plurality of activity episodes within the meeting, wherein for each respective activity episode of the plurality of activity episodes, the utterance features include at least one utterance feature associated with the respective activity episode; generating, by the computing system, a plurality of episode summaries, wherein generating the plurality of episode summaries comprises, for each respective activity episode of the plurality of activity episodes: determining, by the computing system, based on the utterance features associated with the respective activity episode, a conversational activity type associated with the respective activity episode; and producing, by the computing system, an episode summary for the respective activity episode that is dependent on the determined conversational activity type associated with the respective activity episode, the episode summary for the respective activity episode summarizing a conversational activity that occurred during the respective activity episode; and combining, by the computing system, the plurality of episode summaries to generate a summary of the meeting.

In some examples, this disclosure describes a computing system for automatically generating abstractive summaries of meetings, the computing system comprising: a memory configured to store a transcript of a meeting; and one or more processing circuits configured to: produce, based on the transcript of the meeting, a data structure that comprises utterance features; determine, based on the transcript of the meeting, temporal bounds of a plurality of activity episodes within the meeting, wherein for each respective activity episode of the plurality of activity episodes, the utterance features include at least one utterance feature associated with the respective activity episode; generating a plurality of episode summaries, wherein the one or more processing circuits are configured such that, as part of generating the plurality of episode summaries the one or more processing circuits, for each respective activity episode of the plurality of activity episodes: determine, based on the utterance features associated with the respective activity episode, a conversational activity type associated with the respective activity episode; and produce an episode summary for the respective activity episode that is dependent on the determined conversational activity type associated with the respective activity episode, the episode summary for the respective activity episode summarizing a conversational activity that occurred during the respective activity episode; and combine the plurality of episode summaries to generate a summary of the meeting.

In some examples, this disclosure describes a non-transitory computer-readable medium comprising instructions, wherein execution of the instructions causes one or more processing circuits of a computing system to perform operations comprising: obtaining a transcript of a meeting; producing, based on the transcript of the meeting, a data structure that comprises utterance features; determining, based on the transcript of the meeting, temporal bounds of a plurality of activity episodes within the meeting, wherein for each respective activity episode of the plurality of activity episodes, the utterance features include at least one utterance feature associated with the respective activity episode; generating a plurality of episode summaries, wherein generating the plurality of episode summaries comprises, for each respective activity episode of the plurality of activity episodes: determining, based on the utterance features associated with the respective activity episode, a conversational activity type associated with the respective activity episode; and producing an episode summary for the respective activity episode that is dependent on the determined conversational activity type associated with the respective activity episode, the episode summary for the respective activity episode summarizing a conversational activity that occurred during the respective activity episode; and combining the plurality of episode summaries to generate a summary of the meeting.

This disclosure describes techniques with reference to specific examples. However, the intent is to cover all modifications, equivalents, and alternatives of the techniques that are consistent with this disclosure. Numerous specific details are set forth, such as number of episodes, length of episode, type of communication activity, type of conversation, number of steps, etc., in order to provide a thorough understanding of the present design. It will be apparent, however, to one of ordinary skill in the art that the present design can be practiced without these specific details. In other instances, well-known components or methods have not been described in detail but rather in a block diagram in order to avoid unnecessarily obscuring the present design. Thus, the specific details set forth are merely exemplary. Also, the features implemented in one embodiment may be implemented in another embodiment where logically possible. The specific details can be varied from and still be contemplated to be within the spirit and scope of the present design.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 2 is an example of an abstractive summary generated in accordance with techniques of this disclosure.

Like reference characters refer to like elements throughout the figures and description.

DETAILED DESCRIPTION

Figure 1:
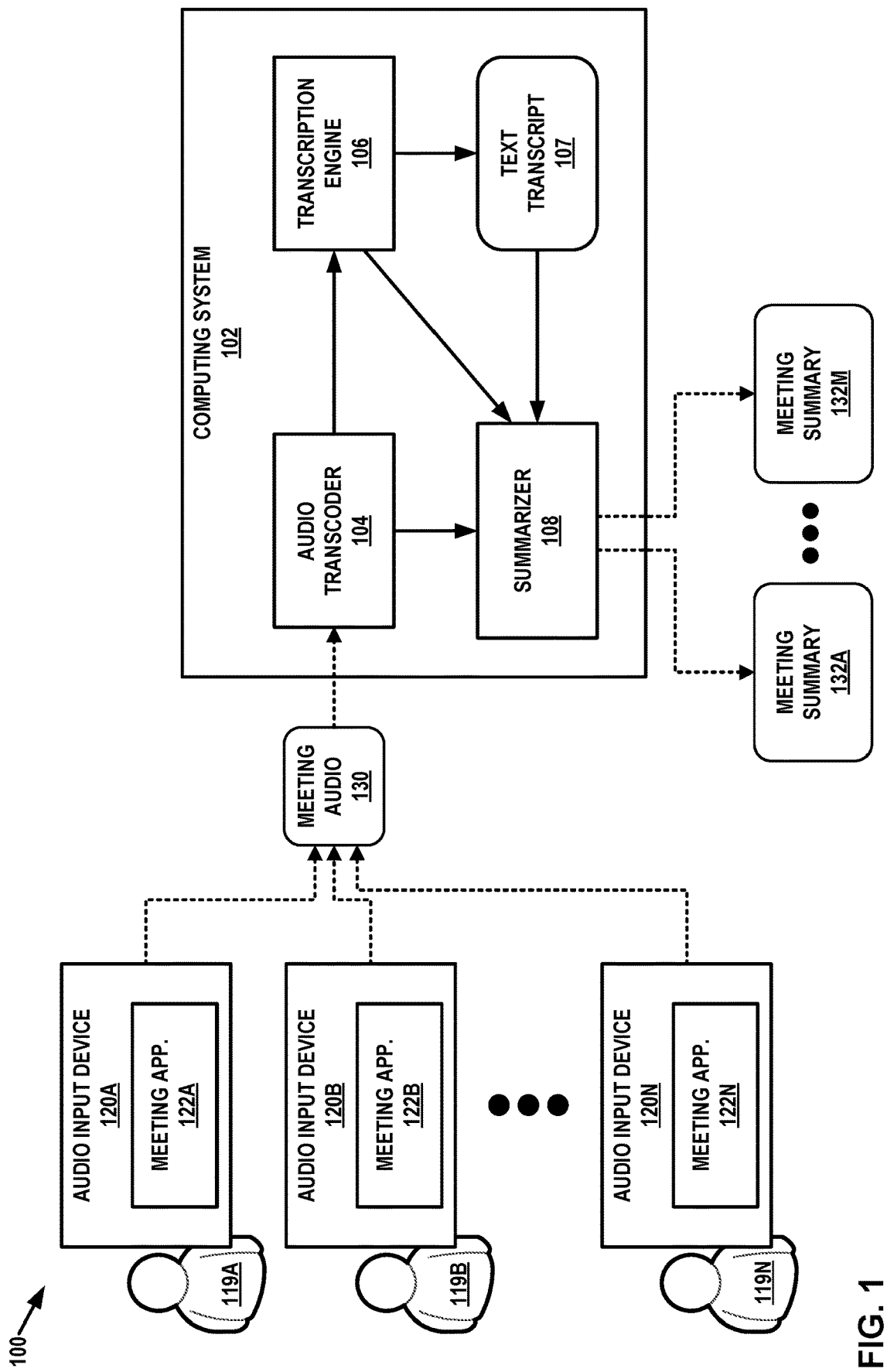
FIG. 1 is a block diagram illustrating an example system for generating meeting summaries, in accordance with techniques of this disclosure.

Spoken conversations are an indispensable means for getting things done. They come in many varieties, from software development scrums to technical "brown-bag" discussions to project planning meetings. Spoken conversations are useful because they can be an incredibly efficient way to make decisions, share information, and solve problems. They are the fundamental natural mode for language-based human interaction. For ease of explanation, this disclosure may use the term "meeting" to refer to spoken exchanges between two or more people and also spoken monologues, such as a speech or presentation, given by a single participant.

However, it is easy for a participant in a meeting to forget what was discussed during a meeting. For example, a participant may say that they will perform some action during the meeting, but then forget that they said they would perform the action. In the past, computing systems have been used to automatically generate transcripts of meetings. The transcript of a meeting is a written version of the words uttered during the meeting. A user may then review the transcript to determine what happened during the meeting. However, reading through a transcript may be a time-consuming endeavor. For instance, a business executive might not have time to review what may be a lengthy transcript in order to determine which member of the executive's team committed to which actions or who advocated for which courses of action.

Moreover, the events that happen in conversations, however, are usually not documented thoroughly. Sometimes, meeting minutes are taken by a minute-taker, or a video recording of a conversation is preserved. Usually, however, participants are burdened with taking their own private notes. In organizations where a more disciplined recording of notes is dictated, the process is usually viewed as a hindrance to productivity and a distraction to participation in the conversation. Ultimately, a lack of shared public documentation causes information loss and misunderstandings about what actually happened, what the outcomes were, and what to do about them.

This disclosure describes techniques for implementing an automated system that may address these problems and produce conversation summaries automatically using an abstractive summarization method. The system may produce summaries of decisions, action items, and other important conversational actions and outcomes, and distribute these to users. The system may associate important factual details with each summary, including links to relevant portions of the conversation recording. The system may then make the summaries available to late-comers or absentees who want to know what happened, or participants themselves who need a reminder of key outcomes. The system may produce abstractive summaries by first digesting the expressed meanings of the conversation (i.e., understanding its "content"), distilling this into its essential parts, and then generating new language to describe those essential pieces of the conversation.

As described herein, the automated system targets the communicative activities within a meeting, such as a conversation. It is recognized that spoken communication can typically be broken into episodes (usually in the order of 30 seconds to 10 minutes long). For example, consider a 30-minute project planning meeting consisting of three episodes: a 10-minute episode consisting of reports on project status from each of the participants, followed by a 15-minute episode during which the participants debate various aspects of their project, and a final 10-minute episode during which the participants agree to execute future tasks (action items). The automated system of this disclosure may identify the temporal bounds of these episodes, identify the activity type of each of the episodes, and may then apply a type-specific summarization process to each episode. The automated system may then collect each episode summary into a sequential, time-indexed summary of the meeting. There may be several benefits associated with this type of approach. For example, the participants may be able to understand the context of the conversations in a more advantageous way. Additionally, the load on the notetakers may be reduced. As another example, type-specific summarization of an episode may produce episode summaries that more accurately and/or concisely expresses and accords with the intent(s) of the participant(s) in the episode.

FIG. 1 is a block diagram illustrating an example system 100 for generating meeting summaries, in accordance with techniques of this disclosure. System 100 includes a computing system 102 and one or more audio input devices 120A-120N (collectively, "audio input devices 120"). Computing system 102 is a system of one or more computing devices.

For example, computing system 102 may comprise one or more server devices, personal computers, smartphones, tablet computers, wearable devices, special-purpose computing devices, or other types of computing devices.

Each of audio input devices 120 may be configured to generate a respective audio signal based on sounds detected by audio input devices 120. Audio input devices 120 may represent a variety of devices or combinations of devices, such as telephones, conferencing devices, desktop or laptop computers, special-purpose microphone devices, smartphones, tablet computers, voice recorders, wearable devices, or other types of devices configured to generate audio signals based on detected sounds. Although described as input devices, audio input devices 120 may also output audio to users using speakers.

In the example of FIG. 1, users 119A through 119N (collectively, "users 119") participate in a meeting. Although FIG. 1 shows multiple users 119, a meeting may only have one participant, such as the case where a person gives a presentation to a silent audience or makes a dictation. In some examples, such as the example of FIG. 1, each of users 119 is associated with a different one of audio input devices 120. For instance, audio input devices 120 may be the mobile phones of users 119. In other examples, multiple users 119 may be associated with a single one of audio input devices 120. For instance, multiple users 119 may meet in a conference room and one of audio input devices 120 is a teleconferencing device situated in the conference room. In this example, the teleconferencing device may be able to detect the sounds of spoken utterances of each of users 119 in the conference room. In some examples, all of users 119 are present in the same location during a meeting. In other examples, two or more of users 119 are present in different locations during a meeting.

In some examples, audio input devices 120 execute respective meeting applications 122A-122N by which respective users 119A-119N participate in a meeting. Each of meeting applications 122 may include a conferencing application, a Voice over Internet Protocol (VoIP) application, a Video over IP application, a video conferencing application, an Internet-based video conference application, or a telephone application. In some examples, one or more of audio input devices 120 includes special-purpose circuitry configured to perform all or part of the functionality described in this disclosure with respect to meeting applications 122.

In some examples, a centralized meeting application executed by computing system 102 or another computing system receives audio signals (and in some cases other media) from audio input devices 120 and may distribute the audio signals among audio input devices 120 for listening by users 119. The centralized meeting application may be cloud-based. In some examples, one or more computing devices (e.g., one or more computing devices of computing system 102) include special-purpose circuitry configured to perform all or part of the functionality described in this disclosure with respect to the centralized meeting application.

Audio input devices 120 include input devices to detect sound, such as the sound of spoken utterances from users 119 and other types of sounds and convert the received sound to audio signals. The combination of all audio signals generated by audio input devices 120 is meeting audio 130. In some examples, the audio signals generated by audio input devices 120 is mixed (e.g., by computing system 102) to generate meeting audio 130. In other examples, meeting audio 130 comprises two or more separate audio signals that are not mixed together. Meeting applications 122 and/or a centralized meeting application may record meeting audio 130 to an audio file for storage and later processing.

Computing system 102 may obtain meeting audio 130. For example, meeting applications 122 and/or a centralized meeting application may stream meeting audio 130 to computing system 102. In some examples, computing system 102 may generate meeting audio 130, e.g., by mixing audio signals from two or more of audio input devices 120. For instance, computing system 102 may execute the centralized meeting application, and in some cases, generate meeting audio 130 from audio signals received from audio input devices 120.

In the example of FIG. 1, computing system 102 includes an audio transcoder 104, a transcription engine 106, and a summarizer 108. In other examples, computing system 102 may include more, fewer, or different components. Each of these components may include software executed by processing circuitry, hardware, or a combination of software and hardware. Audio transcoder 104 receives audio signals generated by audio input devices 120 or a mix thereof, in the form of meeting audio 130, and may convert meeting audio 130 to an appropriate file format for transcription engine 106, which may be executed by a local server, or remote server, such as a cloud-based transcription service.

Transcription engine 106 provides speech-to-text conversion on an audio stream or recording of the conversation occurring in a meeting and produces a text transcript 107. Transcription engine 106 may further perform diarization, in which each transcribed utterance is "diarized," i.e., tagged or associated with a corresponding participant who spoke the utterance, such as by using speaker identification techniques to analyze the meeting audio. In some examples, diarization may include adding the identity of the speakers to text transcript 107. In some examples where transcription engine 106 performs diarization, the identity may not be known but the roles of the speakers may be known, where roles may include "leader," "manager," "meeting facilitator," "audience member," "participant," "officer," and so forth. In some examples where each of the speakers has their own microphones, each of the microphones may be associated with a different speaker's name and transcription engine 106 may perform diarization by adding the speaker's name to text transcribed from speech captured by the microphone associated with the speaker. In other examples, transcription engine 106 may use acoustical directional processing to determine the origin directions of speech sounds. Based on data indicating the positions of each of the speakers and the origin directions of the speech sounds, transcription engine 106 may perform diarization by adding the speaker's name to text transcribed from speech originating from various origin directions. Thus, text transcript 107 may comprise text of utterances in a meeting along with labels identifying people or roles of those who spoke the utterances.

In some examples, audio transcoder 104 and/or transcription engine 106 may be distributed in whole or in part to audio input devices 120 such that audio input devices 120 may perform the audio transcoding and transcription. In such cases, audio input devices 120 may send meeting audio 130 as transcoded audio for transcription by transcription engine 106 or, alternatively, may send a partial or complete text transcript 107 for a meeting to computing system 102, rather than audio data.

Summarizer 108 processes text transcript 107 for meeting audio 130 for a meeting to produce meeting summaries 132A through 132M (collectively, "meeting summaries 132") that each contain text summarizing at least portions of the meeting. Computing system 102 may provide summaries 132 to computing devices associated with one or more users, such as users 119 or other users. In some examples, each of summaries 132 is the same. In other examples, two or more of summaries 132 include different text content. In some cases, computing system 102 may provide a single meeting summary 132A for a meeting.

Each of meeting summaries 132 may include one or more textual episode summaries, each of which represents a summary of an episode within the meeting. An episode may include a set of utterances within the meeting that relate to a single matter, where that matter can include, e.g., an introduction, an agenda, an action item or task, an explanation, an overall summary, or other type of episode. An episode summary for an episode may include the full text of the episode as well as text summarizing the episode.

In one example, consider a conversation outcome that is essential to workplace meetings such as the commitment to future action (i.e., the "action item"). Workers rely on action items because they formalize one of most important reasons for having conversations in the first place, i.e., to make decisions and plan next steps. If action items are misremembered or missed, this may cause problems for the organization and its members. Consider the following extract from a recorded project planning meeting (Burger et al., "The ISL Meeting Corpus: The impact of meeting type on speech style." In proceedings of the 7th International Conference on Spoken Language Processing, ICSLP2002-INTERSPEECH 2002, Denver, Colo., USA, Sep. 16-20, 2002):

Sarah: Yeah. also, cause you said you were gonna send me an email about how to set up our travel.
Harry: Yeah, I'm gonna send—yeah, I'll send you the email uhm when I go back. send you the email. uhm and you're gonna have to contact him, and they have a travel agency.
Sarah: Okay.

Being able to view a transcript like this could be quite useful to someone trying to remember their action items. However, a better summary would be abstractive and allow a user to quickly understand that action item. FIG. 2 is an example of an abstractive summary 200 generated in accordance with techniques of this disclosure. The example of FIG. 2 is based on the example conversation between Sarah and Harry set forth in the previous paragraph. A user, such as Sarah, Harry, or another user, may be able to use the abstractive summary of FIG. 2 to quickly understand that Harry committed to send an email to Sarah about travel. FIG. 2 is an example of a type-specific episode summary, in that the abstractive summary 200 of FIG. 2 is specific to the action item commitment type of conversational activity.

One problem with conventional approaches is that they typically focus on the subject matter of the conversation, seeking to identify the most topically relevant words and utterances in the conversation. A problem with applying this approach to spoken conversation is that spoken conversation is generally much more oriented toward performing activities to achieve outcomes. Sometimes they are solely about communicating information (subject matter) from one person to another, which is the usual job of textual communication. But usually they are much more about what happened, what was achieved, how things went, and what to do next, as opposed to what information did the participants provide?

The techniques of this disclosure focus on communicative activities. It is recognized that spoken communication can typically be broken into episodes (usually in the order of 30 seconds to 10 minutes long). For example, consider a 30-minute project planning meeting consisting of three episodes: a 10-minute episode consisting of reports on project status from each of the participants, followed by a 15-minute episode during which the participants debate various aspects of their project, and a final 10-minute episode during which the participants agree to execute future tasks (action items). In accordance with the techniques of this disclosure, summarizer 108 identifies the temporal bounds of these episodes, identifies the activity type of each of them, and then applies a type-specific summarization process to each episode. Summarizer 108 may then collect each episode summary into a sequential, time-indexed summary of the meeting. The techniques of this disclosure may address the deficiencies of a purely extractive approach by generating abstractive summaries that are more readily usable and readable. Additionally, summarizer 108 may address the deficiencies of approaches that target subject-matter by generating summaries oriented toward communicative activities and achievements. Also, summarizer 108 may employ summarization processes that are activity-type specific, which may address the unique characteristics of particular types of conversational activities, producing type-specific episode summaries that are more readily digestible and usable.

Figure 3:
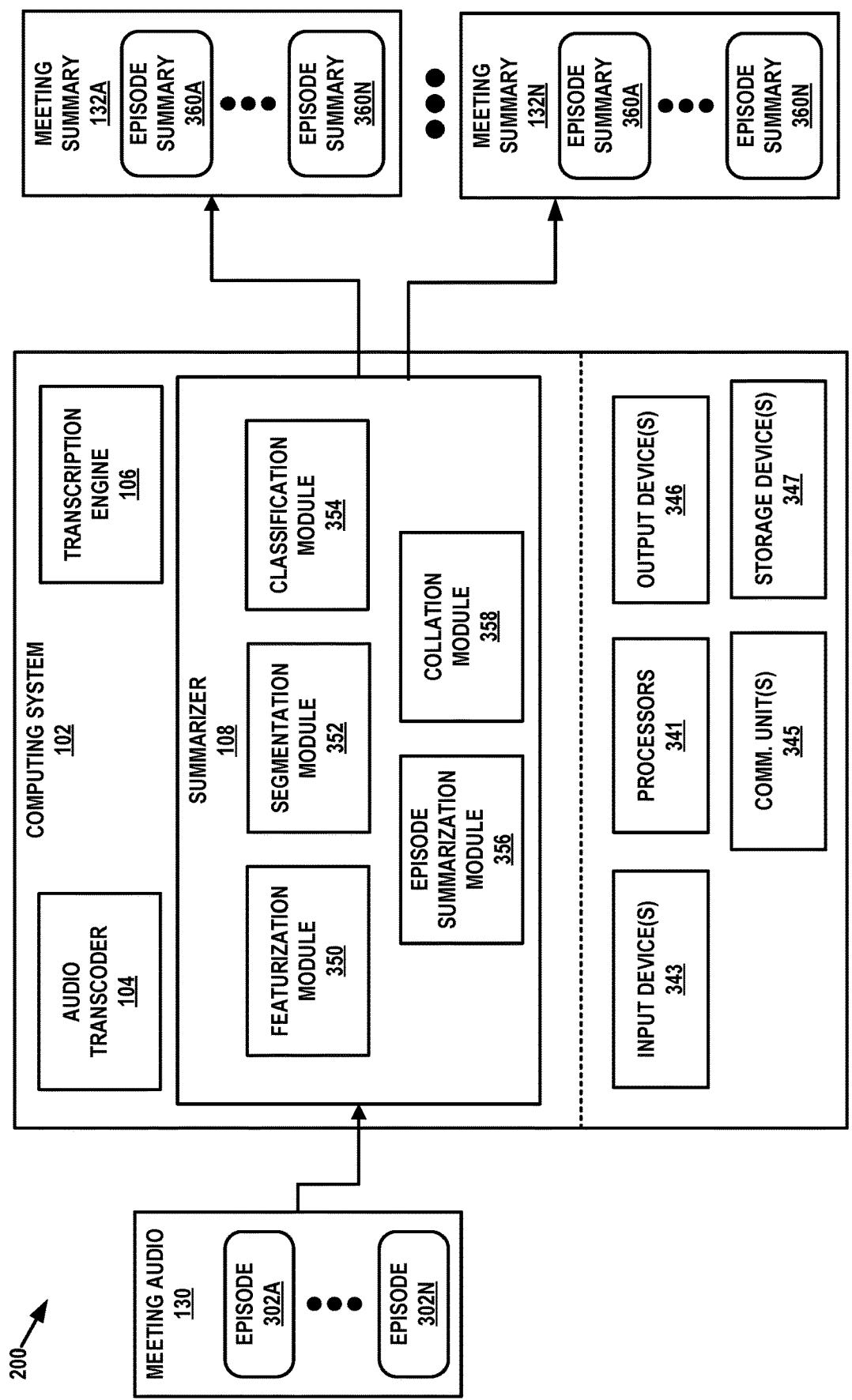
FIG. 3 is a block diagram illustrating an example instance of the computing system of FIG. 1, according to techniques of this disclosure.

FIG. 3 is a block diagram illustrating an example instance of computing system 102 of FIG. 1, according to techniques of this disclosure. In this example, computing system 102 includes one or more input devices 343, one or more processors 341, one or more output devices 346, one or more storage devices 347, and one or more communication units 345. In some examples, computing system 102 represents a cloud computing system, server farm, and/or server cluster (or portion thereof) that provides services to client devices and other devices or systems. In other examples, computing system 102 may represent or be implemented through one or more virtualized compute instances (e.g., virtual machines, containers) of a data center, cloud computing system, server farm, and/or server cluster. As shown in the example of FIG. 3, computing system 102 may obtain meeting audio 130, which may include audio of conversational episodes 302A through 302N (collectively, "conversational episodes 302").

One or more of the devices, modules, storage areas, or other components of computing system 102 may be interconnected to enable inter-component communications (physically, communicatively, and/or operatively). In some examples, such connectivity may be provided by through communication channels, a system bus, a network connection, an inter-process communication data structure, or any other method for communicating data.

One or more processors 341 of computing system 102 may implement functionality and/or execute instructions associated with computing system 102 or associated with one or more modules illustrated herein and/or described below. One or more processors 341 may be, may be part of, and/or may include processing circuitry that performs operations in accordance with one or more aspects of the present disclosure. Examples of processors 341 include microprocessors, application processors, display controllers, auxiliary processors, one or more sensor hubs, and any other hardware configured to function as a processor, a processing unit, or a processing device. Computing system 102 may use one or more processors 341 to perform operations in accordance with one or more aspects of the present disclosure using software, hardware, firmware, or a mixture of hardware, software, and firmware residing in and/or executing at computing system 102.

One or more communication units 345 of computing system 102 may communicate with devices external to computing system 102 by transmitting and/or receiving data, and may operate, in some respects, as both an input device and an output device. In some examples, communication units 345 may communicate with other devices over a network. In other examples, communication units 345 may send and/or receive radio signals on a radio network such as a cellular radio network. In other examples, communication units 345 of computing system 102 may transmit and/or receive satellite signals on a satellite network such as a Global Positioning System (GPS) network. Examples of communication units 345 include a network interface card (e.g. such as an Ethernet card), an optical transceiver, a radio frequency transceiver, a GPS receiver, or any other type of device that can send and/or receive information. Other examples of communication units 345 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 343 may represent any input devices of computing system 102 not otherwise separately described herein. One or more input devices 343 may generate, receive, and/or process input from any type of device capable of detecting input from a human or machine. For example, one or more input devices 343 may generate, receive, and/or process input in the form of electrical, physical, audio, image, and/or visual input (e.g., peripheral device, keyboard, microphone, camera).

One or more output devices 346 may represent any output devices of computing system 102 not otherwise separately described herein. One or more output devices 346 may generate, receive, and/or process input from any type of device capable of detecting input from a human or machine. For example, one or more output devices 346 may generate, receive, and/or process output in the form of electrical and/or physical output (e.g., peripheral device, actuator).

One or more storage devices 347 within computing system 102 may store information for processing during operation of computing system 102. Storage devices 347 may store program instructions and/or data associated with one or more of the modules described in accordance with one or more aspects of this disclosure. One or more processors 341 and one or more storage devices 347 may provide an operating environment or platform for such modules, which may be implemented as software, but may in some examples include any combination of hardware, firmware, and software. One or more processors 341 may execute instructions and one or more storage devices 347 may store instructions and/or data of one or more modules. The combination of processors 341 and storage devices 347 may retrieve, store, and/or execute the instructions and/or data of one or more applications, modules, or software. Processors 341 and/or storage devices 347 may also be operably coupled to one or more other software and/or hardware components, including, but not limited to, one or more of the components of computing system 102 and/or one or more devices or systems illustrated as being connected to computing system 102.

In some examples, one or more storage devices 347 are temporary memories, meaning that a primary purpose of the one or more storage devices is not long-term storage. Storage devices 347 of computing system 102 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 320, in some examples, also include one or more computer-readable storage media. Storage devices 320 may be configured to store larger amounts of information than volatile memory. Storage devices 320 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Summarizer 108 in the example of FIG. 3 includes a featurization module 350, a segmentation module 352, a classification module 354, an episode summarization module 356, and a collation module 358. As described in greater detail elsewhere in this disclosure, featurization module 350 may perform an utterance featurization process that processes text transcript 107 (FIG. 1) to produce a data structure containing utterance features. An utterance feature is a numeric value that represents some characteristic (i.e., "feature") of a spoken utterance. The following are some examples of utterance features: (1) the number of personal pronouns in the utterance, (2) the utterance duration in seconds, (3) the age of the speaker of the utterance, or (4) the total number of syllables. To form a comprehensive representation of an utterance, many such features are concatenated together to form a numeric vector which one can refer to as the "utterance feature vector" or "utterance features".

Segmentation module 352 identifies temporally contiguous conversational episodes, producing information regarding the temporal location (e.g., start and end times) of each episode. For each episode, classification module 354 takes the utterance features associated with the episode and determines an activity type (i.e., a conversational activity type) of the episode. Furthermore, for each episode, episode summarization module 356 produces an episode summary based on the determined activity type for the episode. Collation module 358 collates each episode summary of the conversation to generate meeting summaries 132. As shown in the example of FIG. 3, each of meeting summaries 132 may include episode summaries 360A-360N (collectively, "episode summaries 360"). In some examples, different meeting summaries 132 may include different episode summaries 360.

Figure 4:
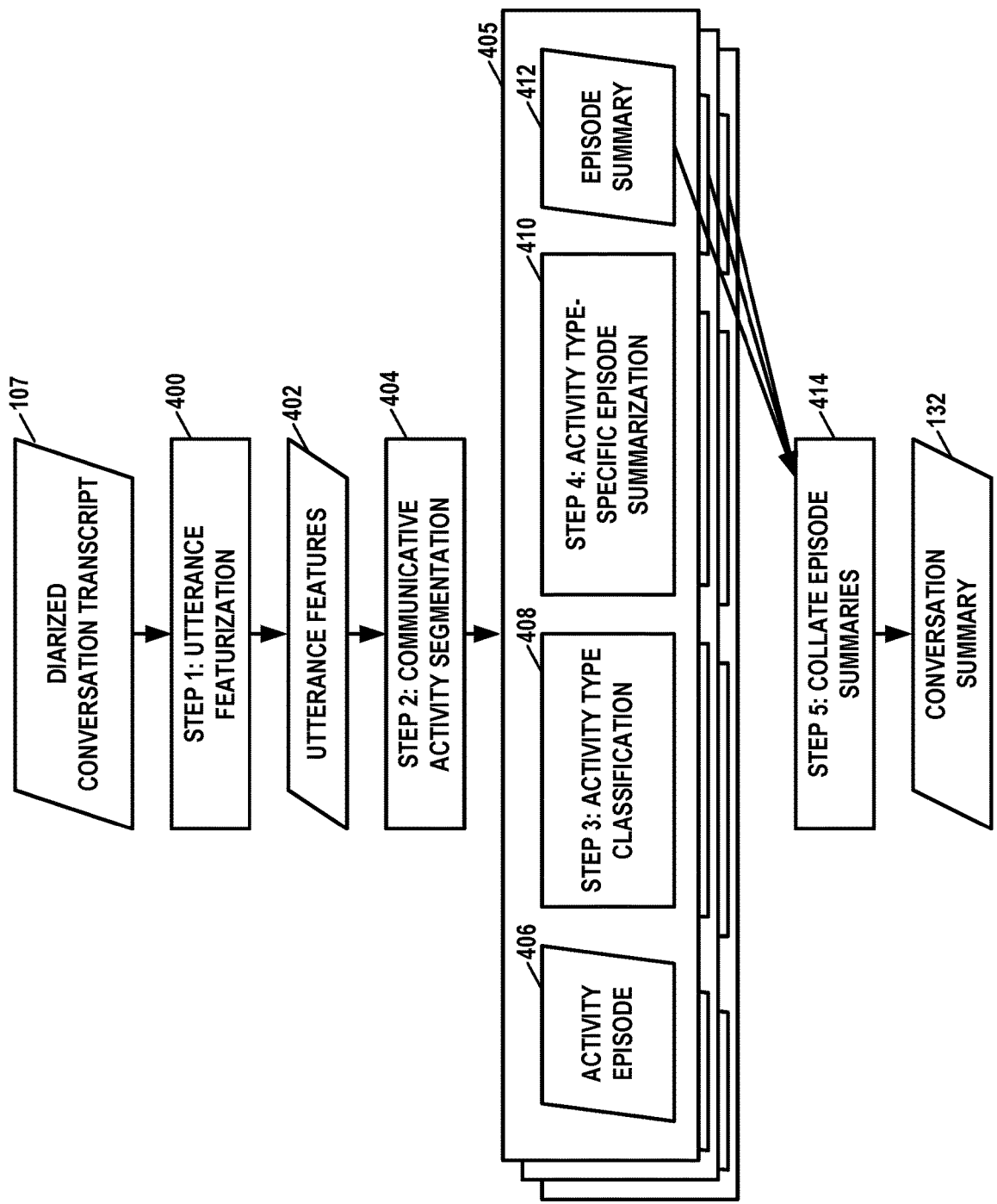
FIG. 4 is a conceptual diagram illustrating an example conversation summarization process, in accordance with a technique of this disclosure.

FIG. 4 is a conceptual diagram illustrating an example conversation summarization process, in accordance with a technique of this disclosure. In the example of FIG. 4 and other figures of this disclosure, slanted boxes correspond to data and square-cornered boxes correspond to actions.

In the example of FIG. 4, featurization module 350 (FIG. 3) receives diarized conversation transcript 107 and performs an utterance featurization step (400). In the example of FIG. 4, utterance featurization step is denoted as "Step 1." As a result of performing the utterance featurization step, featurization module 350 generates utterance features 402. Utterance featurization is the transformation of utterance transcripts (e.g., diarized conversation transcript 107) into sets of numeric features (i.e., utterance features) that are used as inputs to subsequent steps in the summarization process.

Figure 5:
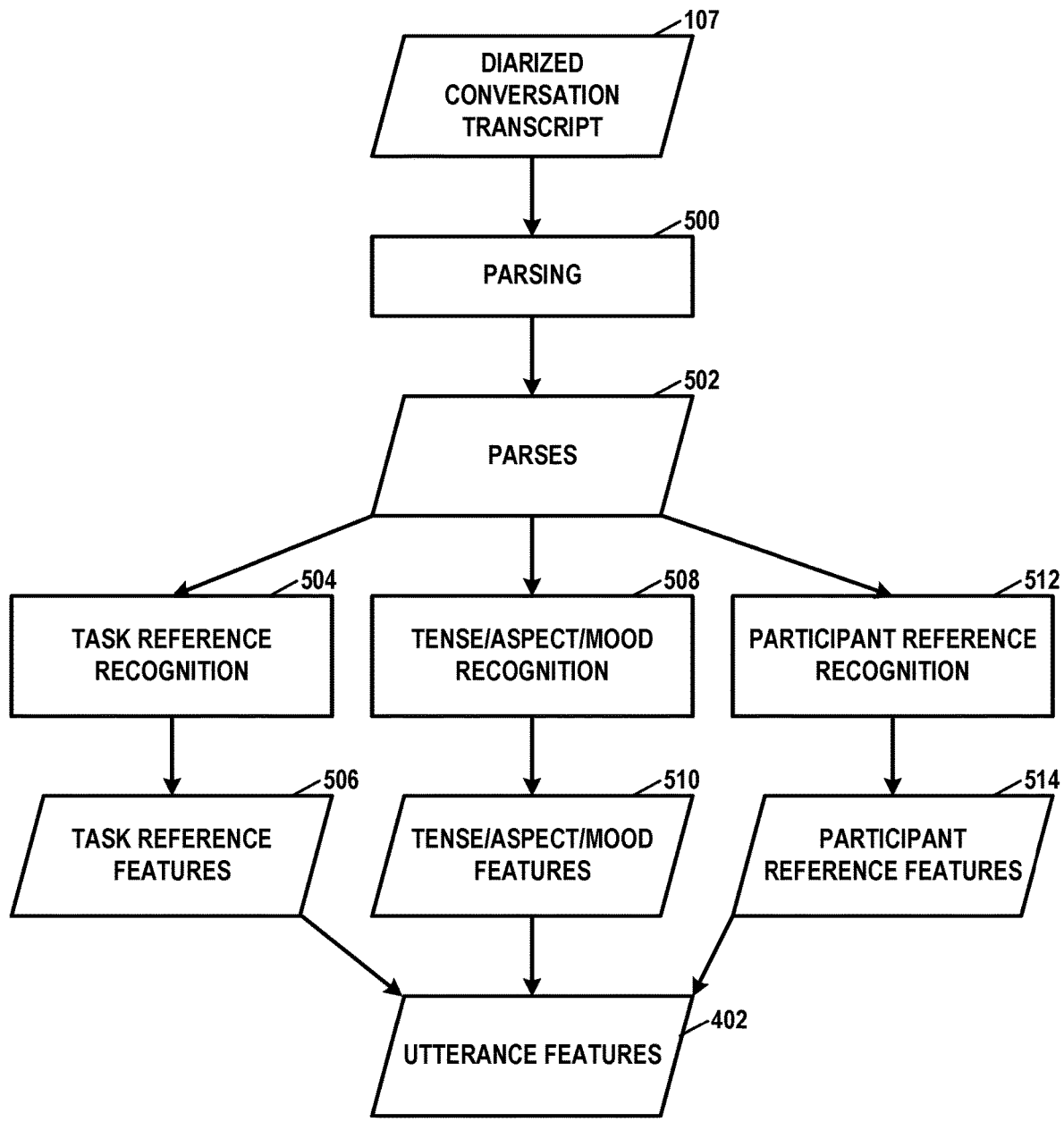
FIG. 5 is a conceptual diagram illustrating an example utterance featurization process, in accordance with a technique of this disclosure.

In some examples, utterance featurization processes may be specifically-designed to support summarization of specific types of activity episodes. For instance, an action item commitment conversation episode may be specifically designed to support summarization of action item commitment conversation episodes, which are particular types of episodes. More specifically, an action item commitment conversation episode is an activity episode in which at least one of the participants agrees to perform some action or task at a future time. FIG. 5, which is described in detail below, is a conceptual diagram illustrating an example utterance featurization process, such as an utterance featurization process that is specifically designed to support summarization of action item commitment conversation episodes. In some examples, an utterance featurization process may extract utterance features for multiple types of activity episodes. Such an utterance featurization process may be considered to be specifically designed to support summarization of each of these types of activity episodes.

Furthermore, in the example of FIG. 4, segmentation module 352 (FIG. 3) performs a communicative activity segmentation process that determines, based on the diarized conversation transcript 107, temporal bounds of one or more (e.g., a single activity episode or a plurality of activity episodes) activity episodes within a meeting (404). In this way, segmentation module 352 identifies activity episodes. The example of FIG. 4, the communicative activity segmentation process is denoted as "Step 2." Activity segmentation is the process of identifying a contiguous temporal region of a conversation in which a coherent episode of communicative activity has occurred. In other words, the process of activity segmentation produces a segmentation of the conversation that is akin to drawing a horizontal line between the sections of a document. In other words, the utterances of a conversation are grouped together to form temporal contiguous episodes. To form temporal contiguous episodes, segmentation module 352 may first form vectors of the utterance features of each utterance. Based upon the utterance feature vectors, segmentation module 352 may derive an episode-level feature vector by adding together the utterance feature vectors of all the utterances in the episode. In some examples, segmentation module 352 may perform the activity segmentation process by considering all possible segmentations of the meeting, calculating a score for each segmentation. In this example, the score for a segmentation is the sum of the entropy of episode feature vectors in the conversation. The entropy of an episode feature vector may be defined as the sum of the entropy each utterance feature in the episode feature vector, where the entropy of an utterance feature may be defined as $H(X)=E[-\log(P(X))]$, where H is the entropy, X is a discrete random variable (i.e., the value of the utterance feature), log is a logarithm function, and $P(X)$ is a probability mas function of X. The segmentation with the lowest score (i.e., the minimum total entropy) is selected as the segmentation.

In some examples, the communicative activity segmentation process may be specifically designed to support specific types of activity episodes. For example, an activity segmentation process can be specifically designed to support summarization of action item commitment conversation episodes. The process involves submitting the results of the Action Item Commitment featurization process defined in the previous section and elsewhere in this disclosure (e.g., with respect to FIG. 5) as input to the generic episode segmentation algorithm. In an example where an activity segmentation process is specifically designed to support summarization of action item commitment conversation episodes, the parameters of the activity segmentation algorithm may be adjusted to optimize accuracy on a set of manually-annotated Action Item Commitment training examples.

As described above, the utterance features may be the primary input to the segmentation algorithm. By modifying the set of utterance features included in the processing, the nature of the segmentation can be influenced. To cause the segmentation algorithm to produce a segmentation that identifies action item commitment episodes, utterance features may be incorporated that are indicative of action item discussions, and utterance features that are not indicative of action item discussions may be excluded. Therefore, the process of adjusting the segmentation to suit a particular desired segmentation may be one of adding or excluding certain features from the feature vector. For example, for action item segmentation, utterance features relevant for action items, such as (1) mentions of future tasks, (2) mentions of meeting participants, and (3) mentions of temporal expressions would be included, while other features would be excluded.

FIG. 4 includes a set of overlapped boxes 405, each of which corresponds to a different one of the activity episodes identified by segmentation module 352. Thus, there may be a respective activity episode 406, activity type classification step 408, activity type-specific summarization step 410, and episode summary 412 for each of the activity episodes identified by segmentation module 352. Activity episode 406 may comprise those utterance features 402 that are associated with a respective activity episode.

For each of the identified activity episodes, classification module 354 (FIG. 3) may use the utterance features for the activity episode 406 to perform an activity type classification process to determine an activity type of the activity episode (408). In the example of FIG. 4, the activity type classification process is denoted as "Step 3." Activity type classification is a process of classifying the type of a detected activity episode. This disclosure may use the term "activity type classification process" to refer to an activity type classification process that is specifically designed to support summarization of Action Item Commitment conversation episodes. An activity type classification process may also support summarization of other processes or there may be separate processes to classify different types of activity episodes. The activity type classification process involves submitting the results of the Action Item Commitment featurization process defined above and elsewhere in this disclosure as input to the activity type classification algorithm defined in the previous section. In some examples, the activity type classification algorithm is a supervised machine learning algorithm in which a classification model is learned automatically from a set of manually annotated Action Item Commitment training examples. For instance, in such examples, the activity type classification algorithm may be implemented using a standard statistical classification model such as Decision Trees, Neural Networks, or Support Vector Machines to perform this task. Manually-labeled utterances may be used as a training set, and a model to predict whether the episode is of the labeled type may be learned from this.

Figure 6:
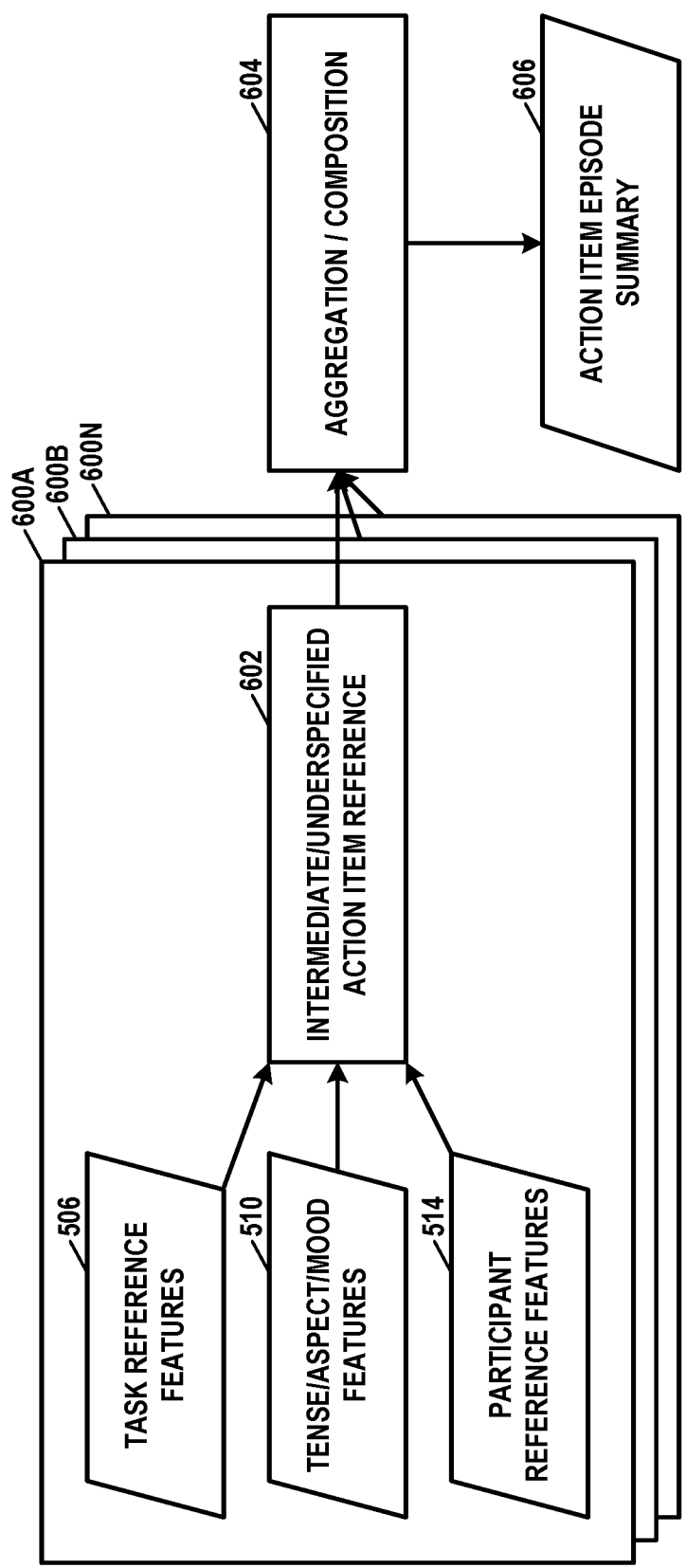
FIG. 6 is a conceptual diagram illustrating an example episode summarization process, in accordance with a technique of this disclosure.

Additionally, episode summarization module 356 (FIG. 3) may perform an activity type-specific summarization process to produce an episode summary 412 for activity episode 406 (410). That is, the summarization process to product episode 412 for activity episode 406 may be dependent on the conversational activity type determined for activity episode 406. In the example of FIG. 4, the activity type-specific summarization process is denoted as "Step 4." Episode summarization is the process of accumulating and synthesizing observations in an activity episode to produce an abstractive summary of the episode. This process is illustrated in the example of FIG. 6.

Collation module 358 may perform a collation process to collate episode summaries 412 of a conversation or meeting to generate at least one conversation summary 132, which is an example of a meeting summary (414). In the example of FIG. 4, the collation process is denoted as "Step 5." In conversation summary 132, each of episode summaries 412 may be linked to a corresponding location in an original transcript and/or to a corresponding location in an audio recording. For instance, as noted above, segmentation module 352 may determine temporal locations of the activity episodes. For instance, segmentation module 352 may determine that a particular activity episode begins at minute 1:30 of meeting audio 130 (FIG. 1) and ends at minute 2:56 of meeting audio 130. In this example, collation module 358 may use the temporal locations of the activity episodes to order the activity episodes within conversation summary 132. In some examples, collation module 358 may use the temporal locations of the activity episodes to generate links or other references to corresponding locations in meeting audio 130 and/or text transcript 107.

The sequence of steps described above produces a segmentation and segment summarization for a particular activity type. The system may therefore be configured to produce multiple independent segmentations and segment summaries for multiple different activity types by applying them in parallel. In this case, the detected and summarized episodes may overlap with summarized episodes of a differing activity type.

In some examples, the Utterance Featurization and Communicative Activity Segmentation steps (i.e., steps 402 and 404) can be performed in batch on an entire conversation transcript, or they can be executed in an iterative, on-line, real-time manner, one utterance at a time. In the real-time mode, as utterances are processed one by one, the Communicative Activity Segmentation will eventually determine that an episode segmentation point has been reached. At this point, it is possible to proceed to Step 3 for any episodes that have been completed. In this manner, the summary can be accumulated one segment at a time in a dynamic fashion.

To provide concrete evidence to support the abstracted episodic summaries (e.g., episode summaries 412), the system (e.g., computing system 102) may also use an extractive utterance extraction algorithm. In this case, rather than applying type-specific analysis (as performed in Step 4 of FIG. 4, the system may apply a lexically-oriented extractive summarization algorithm which causes the system to identify and select a small set of highly relevant but non-redundant set of utterances to characterize the main content of each activity episode. For instance, TextRank (available from https://web.eecs.umich.edu/mihalcea/papers/mihalcea.emnlp04.pdf) is an example of a lexically-oriented extractive summarization algorithm that the system may use to identify and select such utterances. In general terms, the TextRank algorithm interprets each utterance as carrying some semantic meaning, and each pair of utterances as having some semantic similarity. Then, the TextRank algorithm selects those utterances that are central in clusters of semantically similar sets. This may be presented (e.g., by computing system 102, one or more of audio input devices 120, and/or other devices) to a user in addition to or in the alternative to the abstractive summary. That is, computing system 102 may select a set of utterances to characterize content of the activity episode. In this example, computing system 102 may present the selected set of utterances to a user in addition to an episode summary for the activity episode.

It is to be appreciated that FIG. 4 is one example. Other example conversation summarization processes implemented in accordance with the techniques of this disclosure may include more, fewer, or different steps. For instance, in some example, a conversation summarization process may omit the step of collating episode summaries. In such an example, episode summaries 412 may remain separate.

FIG. 5 is a conceptual diagram illustrating an example utterance featurization process, in accordance with a technique of this disclosure. As noted above, utterance featurization is the transformation of utterance transcripts (e.g., diarized conversation transcript 107) into sets of numeric features (i.e., utterance features) that are used as inputs to subsequent steps in the summarization process. In some examples, utterance featurization processes may be specifically designed to support summarization of specific types of activity episodes. In other examples, an utterance featurization process may extract utterance features for multiple types of activity episodes.

The example utterance featurization process of FIG. 5 is specifically-designed to support summarization of action item commitment conversation episodes. This disclosure may use the term "conversation episode" interchangeably with the term "activity episode." The process of FIG. 5 may comprise or consist of a combination of multiple featurization sub-processes, each of which are described in this disclosure and shown in FIG. 5.

In the example of FIG. 5, featurization module 350 may receive diarized conversation transcript 107. Featurization module 350 may perform a parsing process (500) on the diarized conversation transcript 107. By performing the parsing process, featurization module 350 generates parses 502. Parses 502 may comprise data indicating logical syntactic components within diarized conversation transcript 107. For example, parses 502 may comprise data that identify verb phrases within diarized conversation transcript 107. In some examples, featurization module 350 may use natural language parsing software, such as The Stanford Parser. A description of The Stanford Parser may be found at https://nlp.stanford.edu/software/lex-parser.shtml. The natural language parsing software may produce a tree-formatted output where the words of each utterances (sentence) are assigned to syntactic categories and then assembled by links to each other into a tree structure, where nodes in the tree represent phrases of various syntactic types.

As shown in the example of FIG. 5, one featurization sub-process (i.e., task reference recognition sub-process 504) extracts features that describe references to tasks. References to tasks are verb phrases that describe an action that a person might perform, such as "sending an email" or "preparing the final report for Bob." This featurization sub-process works by applying a syntactic analysis to identify each verb phrase, and then applying a lexical-semantic similarity analysis against an unsupervised co-clustering of a large background collection of similarly identified phrases. This produces an "embedding" representation of the phrase. The lexical-similarity analysis may operate by representing each word or phrase as an "embedding," which is a numeric representation in a space. Semantic similarity may then be computed via a proximity function, e.g., cosine distance or delta divergence, between two embeddings in the space.

As mentioned above, the featurization sub-process may include application of an unsupervised co-clustering of a background collection of similarly identified phrases. In general terms, clustering means the organization of unlabeled data into groups, which may be called clusters. In the context of this disclosure, each cluster may be a set of words or phrases that correspond to the same utterance feature. In one example, featurization module 350 may apply a clustering algorithm such as that found in Section 3 of Dayne Freitag, "Trained Named Entity Recognition Using Distributional Clusters," (available from https://aclweb.org/anthology/W04-3234). In such examples, featurization module 350 may perform an approximate maximization of $M_{X^*Y^*}$, where $M_{X^*Y^*}$ is the mutual information between variables X and Y, X is a random variable over vocabulary terms as found in a text corpus, and Y is a range over immediately adjacent tokens encoding co-occurrences in such a way as to distinguish left and right occurrences. Featurization module 350 may perform the approximate maximization of $M_{X^*Y^*}$ using a simulated annealing procedure in which each trial move takes a symbol x or y out of the cluster to which it is tentatively assigned and places it into another cluster. Featurization module 350 may chose candidate moves by selecting a non-empty cluster uniformly at random, randomly selecting one member of the selected cluster, and then randomly selecting a destination cluster other than the source cluster. When the temperature 0 is reached, featurization module 350 may repeatedly attempt all possible moves until no further improvements are possible. By applying this procedure, featurization module 350 can derive a representation of each term that is a distribution over clustered contexts. This dense vector representation may be viewed as an "embedding".

Furthermore, in the example of FIG. 5, one featurization sub-process (i.e., participant reference recognition sub-process 512) extracts features that describe references to conversation participants. In other words, participant reference recognition sub-process 512 extracts participant reference features 514. References to conversation participants are noun phrases that are used to refer to people who are present in the conversation. Some references are pronominal, such as "you", "I", and "we". Other references are proper names, such as "Dave" and "Janet." For each occurrence of these words and phrases, the featurization sub-process uses either a turn-taking analysis (in the case of pronouns), or background information about the participants' names, to infer who the referent(s) is(are), and then transforms this into a numeric feature, with one feature per participant.

In the example of FIG. 5, one featurization sub-process (i.e., tense/aspect/mood recognition sub-process 508) extracts features that describe the utterance in terms of grammatical tense-aspect-mood. In other words, tense/aspect/mood recognition sub-process 508 extracts tense/aspect/mood features 510. Grammatical tense-aspect-mood are properties of linguistic expressions that typically convey concepts like location in time, fabric of time, degree of necessity, evidentiality, and others. For example, the phrases "have to VB," "will VB," "was going to VB," and "VB'ed", all convey different temporal properties associated with the verb VB. Featurization sub-process 508 may identify these properties by analyzing and extracting the morphology of verbs, compound verb phrases, and auxiliary verbs. Then, the extracted contents are compared (e.g., by featurization sub-process 508) against a co-clustering of a background corpus of such extractions. The co-clustering of the background corpus may be generated using the clustering algorithm described above.

Other utterance featurization processes in accordance with the techniques of this disclosure may include more, fewer, or different featurization sub-processes than those shown in the example of FIG. 5. For example, an additional or alternative utterance featurization sub-process not illustrated in the example of FIG. 5 extracts features that describe agreement-oriented speech acts. Agreement-oriented speech acts are phrases like "OK," "Sure, no problem," or "I don't think so" which communicate agreement or disagreement. This sub-process identifies these phrases using a machine learning trained text classifier. Then, after applying the classifier to identify the phrases, the extracted phrases are compared against the co-clustering of a large background corpus of similarly-extracted phrases. In some examples, a featurization sub-process extracts features that describe references to future dates and times. References to future dates and times are phrases like "tomorrow," "the end of the week," and "nine PM." This featurization sub-process identifies these phrases using a temporal expression identifier, and then transforms the extracted expressions into a numeric feature vector by comparing the extracted phrase to the result of co-clustering a large corpus of such expressions. By performing co-clustering on a large corpus, the featurization sub-process may obtain co-cluster-based embeddings for a collection of temporal phrases. The featurization sub-process may then estimate whether a target phrase is a temporal phrase by measuring the proximity of that target phrase to either the centroid of the temporal phrase cluster, or by computing a generalized mean of the distance from the target to each of the terms in the temporal phrase cluster. The elements of the numeric feature vector are numerical identifiers of the clusters identified for the temporal expressions.

FIG. 6 is a conceptual diagram illustrating an example episode summarization process, in accordance with a technique of this disclosure. There may be different episode summarization processes for different activity types. For example, there may be a first episode summarization process for debate activity episodes (i.e., activity episode in which two or more participants debate something) and a second episode summarization process for action item commitment conversation episodes.

Episode summarization module 356 (FIG. 3) may receive utterance features 402 associated with an activity episode (e.g., activity episode 406). Different episode summarization processes may receive different types of utterance features. For instance, in the example of FIG. 6, box 600A represents an episode summarization process in which episode summarization module 356 may receive task reference features 506, tense/aspect/mood features 510, and participant reference features 514. In another example, an episode summarization process may receive more, fewer, or different types of utterance features. For instance, an episode summarization process may receive utterance features corresponding to agreement-oriented speech acts, utterance features corresponding to references to future times and dates, and/or other utterance features corresponding to other speech acts.

Furthermore, episode summarization module 356 may extract one or more underspecified extractions for the activity episode. Each underspecified extraction may comprise a tuple that consists of one or more features. A tuple is an ordered list of elements. With respect to extractions such as those for an action item, a tuple may contain all of the components of an ordered list representing the information being extracted, e.g., timeframe, owner, task, etc. An underspecified extraction may therefore contain some unknowns as elements in that list. The tuples of underspecified extractions for different activity types may contain different features. For instance, a tuple of an underspecified extraction for a debate activity episode may consist of a first set of elements and a tuple of an underspecified extraction for an action item commitment conversation episode may consist of a second set of elements different from the first set of elements. The elements in the tuple of an underspecified extraction for an activity types may be predefined. Thus, the tuples of each underspecified extraction for a particular activity episode type may always include the same set of elements.

During an activity episode, the participants may mention something multiple times. Thus, an activity episode may make multiple "observations" of the same type of activity within a single activity episode. For example, during an action item commitment episode, one of the participants may indicate several times that they will perform an action in somewhat different ways. For instance, a participant may indicate that they will send an email by Wednesday and then later say that they will send the email by Tuesday instead. Accordingly, episode summarization module 356 may generate multiple underspecified extractions for a single action episode. Each of the underspecified extractions may correspond to a different observation. FIG. 6 includes a set of boxes 600A through 600N (collectively, "boxes 600") that represent different observations.

Episode summarization module 356 may use the underspecified action item extractions for an activity episode to generate an activity episode summary for the activity episode. For example, episode summarization module 356 may aggregate and compose the underspecified action item extractions. The aggregation and composition process may involve first a pair-wise directional similarity comparison of each pair of underspecified extractions. In other words, for each pair of underspecified extractions for the same activity episode, episode summarization module 356 may compare the elements in the tuples of the pair of underspecified extractions. For instance, episode summarization module 356 may compare the first element of the tuple of a first underspecified extraction with the first element of the tuple of a second underspecified extraction; compare the second element of the tuple of the first underspecified extraction with the second element of the tuple of the second underspecified extraction; and so on.

A similarity matrix defined by these pair-wise comparisons is then used as the basis for assigning a numerical weighting to each extraction, with the goal of measuring the importance of each extraction. In other words, episode summarization module 356 may generate a similarity matrix in which each row corresponds to a different one of the underspecified extractions and each column corresponds to a different one of the underspecified extractions. For each cell of the similarity matrix, the cell may indicate how many of the elements of the pair of underspecified extractions match (or do not match). By summing (or otherwise applying a function to) the values in the cells in a row (or column) corresponding to an underspecified extraction, episode summarization module 356 may determine a level of similarity (e.g., a numerical weighting) between the underspecified extraction and the other underspecified extractions. In some examples, an underspecified extraction that is most similar to the other underspecified extractions of the activity episode may be considered to be more important than underspecified extractions of the activity episode that are less similar to the other underspecified extractions of the activity episode.

This importance weighting is then used to select a single underspecified extraction as the principal seed for composition of the abstractive summary. For instance, in examples in which there are a plurality of underspecified extractions for an activity episode, episode summarization module 356 may select, based on the numerical weightings assigned to the underspecified extractions for the activity episode, a particular underspecified extraction from among the plurality of underspecified extractions for the activity episode.

The tuple corresponding to that seed is used to populate a summary, and the contents of any other underspecified extractions that are determined to have a high similarity to the seed are used to populate or supplement the components of the finally produced tuple. For example, there may be different summary templates for different activity types. The summary template for an activity type may include fixed text and blanks. For instance, in the example of FIG. 2, the title "COMMITMENT SUMMARY", "Assigned to:", "Commitment:", "(agreed at:" ", by:" and ")" are each instances of fixed text and the text "Harry", "Send email about travel", "10:34, Wed., 5 Jun. 2007", and "Harry, Sarah" are examples of text inserted into blanks of the summary template. Different summary activity templates for different activity types may have different fixed texts and blanks.

Episode summarization module 356 may populate a summary by filling values of elements of the tuple of the seed into the blanks of the template for the activity type of the activity episode. In some examples where a value is not specified for an element of the tuple of the seed, episode summarization module 356 may fill a blank corresponding to the element with a value for the element from a tuple of an underspecified extraction having high similarity to the seed. For example, let underspecified extraction A be the seed. In this example, the similarity matrix may indicate that underspecified extraction B has fewer differences from underspecified extraction A than any other underspecified extraction for an activity episode. Hence, in this example, if the tuple for underspecified extraction A does not specify a value for element x and the tuple for underspecified extraction B does specify a value for element x, episode summarization module 356 may use the value of element x to fill a blank in the summary template.

Thus, each respective conversational activity type of a predefined plurality of conversational activity types may be associated with a respective tuple that includes a plurality of elements different from pluralities of elements of tuples associated with other conversational activity types of the predefined plurality of conversational activity types. Furthermore, for each respective activity episode of the plurality of activity episodes, episode summarization module 356 may produce an episode summary for the respective activity episode. As part of generating the episode summary for the respective activity episode, episode summarization module 356 may generate one or more intermediate extractions (i.e., underspecified extractions) for the respective activity episode. Each of the one or more intermediate extractions is an instance of a tuple associated with a conversational activity type associated with the respective activity episode. For each respective intermediate extraction of the one or more intermediate extractions for the respective activity episode, episode summarization module 356 may generate the respective intermediate extraction by assembling utterance features from among the utterance features associated with the respective activity episode into tuple components of the tuple of the respective intermediate extraction. In some examples, after generating the plurality of intermediate extractions for the respective activity episode, episode summarization module 356 may perform a pairwise similarity comparison of the intermediate extractions for the respective activity episode. Episode summarization module 356 may then assign, based on the pairwise similarity comparison, numerical weightings to the intermediate extractions for the respective activity episode. Episode summarization module 356 may select, based on the numerical weightings assigned to the intermediate extractions for the respective activity episode, the particular intermediate extraction from among the plurality of intermediate extractions for the respective activity episode.

Furthermore, episode summarization module 356 may use the tuple of a particular intermediate extraction of the one or more intermediate extractions for the respective activity episode to populate the episode summary for the respective activity episode. In some examples, the one or more intermediate extractions includes a plurality of intermediate extractions for the respective activity episode. Episode summarization module 356 may produce the episode summary for the respective activity episode further comprises using, by the computing system, the tuples of one or more of the intermediate extractions other than the particular intermediate extraction to supplement the episode summary for the respective activity episode.

FIG. 6 may be specific to action item commitments. Accordingly, the following defines an episode summarization process for Action Item Commitment conversation episodes. This process is triggered upon positive classification of an Action Item Commitment episode during the previous step. The first step in the process involves extraction of intermediate/underspecified action item extractions. When an activity episode is an action item commitment episode, an underspecified action item extraction may be a tuple consisting of one or more of the following features: (1) a task reference, (2) a conversational participant reference, and/or (3) a future date or time reference. In the example of FIG. 6, the task reference features correspond to task reference features 506, the conversational participant reference corresponds to participant reference features 514, and the future date or time reference corresponds to tense/mood/aspect features 510. The tuple components are assembled from their corresponding featurizations in each utterance. In this way, episode summarization module 356 may generate an intermediate/underspecified action item reference 602.

This disclosure may refer to an underspecified extraction as an intermediate reference. Hence, underspecified action item extraction 602 is labeled intermediate/underspecified action item reference in FIG. 6. Each utterance can have 0 or 1 underspecified action item extraction tuples. The second step involves the aggregation and composition of the underspecified extractions into a final episode summary. Thus, as shown in the example of FIG. 6, episode summarization module 356 may perform an aggregation/composition process 604 to generate action item episode summary 606.

Figure 7:
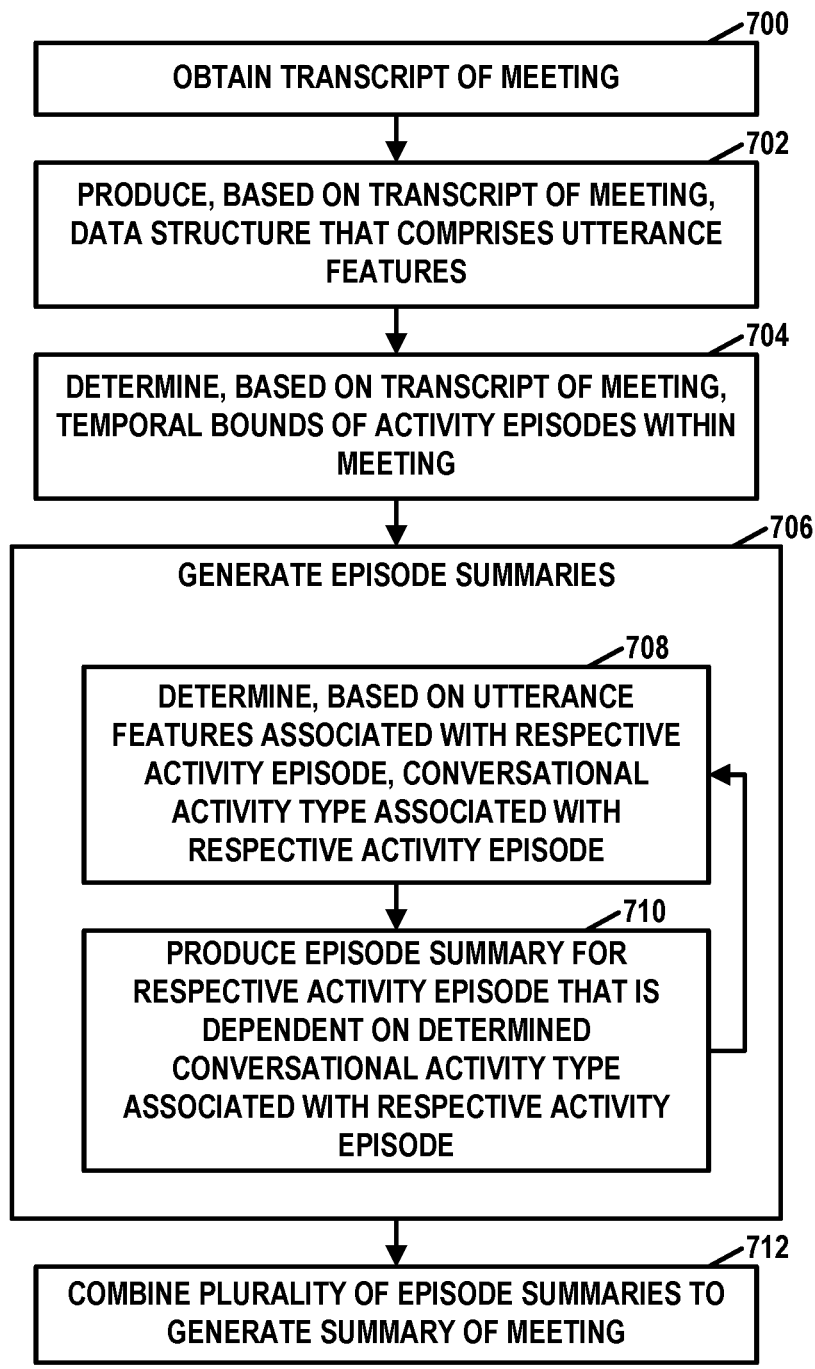
FIG. 7 is a flowchart illustrating an example operation of a computing system for automatically generating summaries of meetings in accordance with a technique of this disclosure.

FIG. 7 is a flowchart illustrating an example operation of a computing system for automatically generating summaries of meetings in accordance with a technique of this disclosure. Other examples may include more, fewer, or different steps than shown in the example of FIG. 7. In the example of FIG. 7, computing system 102 may obtain a transcript of a meeting (700).

Furthermore, computing system 102 may produce, based on the transcript of the meeting, a data structure that comprises utterance features (702). For instance, computing system 102 may determine references to tasks, determine references to conversation participants, determine references to future dates; determine features that describe an utterance in terms of grammatical tense-aspect-mood, determine agreement-oriented speech acts, or other characteristic (i.e., "feature") of a spoken utterance. The data structure may be a vector, array, stack, queue, database, file, or other type of structure for organizing data.

Computing system 102 may determine, based on the transcript of the meeting, temporal bounds of a plurality of activity episodes within the meeting (704). For each respective activity episode of the plurality of activity episodes, the utterance features include at least one utterance feature associated with the respective activity episode. In some examples, two or more of the activity episodes are associated with different conversational activity types and overlap temporally.

Additionally, computing system 102 may generate a plurality of episode summaries (706). As part of generating the plurality of episode summaries, computing system 102 may determine, based on the utterance features associated with a respective activity episode, a conversational activity type associated with the respective activity episode (708). As part of determining the conversational activity type associated with the respective activity episode, computing system 102 may select the conversational activity type associated with the respective activity episode from among a predefined plurality of conversational activity types. Each conversational activity type of the predefined plurality of conversational activity types corresponds to a different type of activity capable of being performed by participants of the meeting by conversing.

Computing system 102 may also produce an episode summary for the respective activity episode that is dependent on the determined conversational activity type associated with the respective activity episode (710). The episode summary for the respective activity episode summarizes a conversational activity that occurred during the respective activity episode. Computing system 102 may perform actions (708) and (710) for each respective activity episode of the plurality of activity episodes. Furthermore, in the example of FIG. 7, computing system 102 may combine the plurality of episode summaries to generate a summary of the meeting (712).

The above examples, details, and scenarios are provided for illustration, and are not intended to limit the disclosure in any way. Those of ordinary skill in the art, with the included descriptions, should be able to implement appropriate functionality without undue experimentation. References in the specification to "an embodiment," "configuration," "version," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Modules, data structures, function blocks, and the like are referred to as such for ease of discussion and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments.

In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, processing circuitry, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media. A computer-readable medium may include any mechanism for storing or transmitting information in a form readable by a machine. For example, a computer-readable medium may include any suitable form of volatile or non-volatile memory. In some examples, the computer-readable medium may comprise a computer-readable storage medium, such as non-transitory media. The term "non-transitory" may indicate that the storage medium is not embodied in a carrier wave or a propagated signal. In certain examples, a non-transitory storage medium may store data that can, over time, change (e.g., in RAM or cache).

What is claimed is:

1. A method for automatically generating summaries of meetings, the method comprising:
    obtaining, by a computing system, a transcript of a meeting;
    producing, by the computing system, based on the transcript of the meeting, a data structure that comprises utterance features;
    determining, by the computing system, based on the transcript of the meeting, temporal bounds of a plurality of activity episodes within the meeting, wherein for each respective activity episode of the plurality of activity episodes, the temporal bounds of the respective activity episode indicate a start time and an end time of the respective activity episode and the utterance features include at least one utterance feature associated with the respective activity episode;
    generating, by the computing system, a plurality of episode summaries, wherein generating the plurality of episode summaries comprises, for each respective activity episode of the plurality of activity episodes:
        determining, by the computing system, based on the utterance features associated with the respective activity episode, a conversational activity type associated with the respective activity episode; and
        producing, by the computing system, an episode summary for the respective activity episode that is dependent on the determined conversational activity type associated with the respective activity episode, the episode summary for the respective activity episode summarizing a conversational activity that occurred during the respective activity episode; and
    combining, by the computing system, the plurality of episode summaries to generate a summary of the meeting.

2. The method of claim 1, wherein determining the utterance features comprises at least one of:

determining references to tasks;
determining references to conversation participants;
determining references to future dates;
determining features that describe an utterance in terms of grammatical tense-aspect-mood; or
determining agreement-oriented speech acts.

3. The method of claim 1, wherein two or more of the activity episodes are associated with different conversational activity types and overlap temporally.

4. The method of claim 1, wherein:
determining the conversational activity type associated with the respective activity episode comprises selecting, by the computing system, the conversational activity type associated with the respective activity episode from among a predefined plurality of conversational activity types, and
each conversational activity type of the predefined plurality of conversational activity types corresponds to a different type of activity capable of being performed by participants of the meeting by conversing.

5. The method of claim 4, wherein:
each respective conversational activity type of the predefined plurality of conversational activity types is associated with a respective tuple that includes a plurality of elements different from pluralities of elements of tuples associated with other conversational activity types of the predefined plurality of conversational activity types; and
for each respective activity episode of the plurality of activity episodes, producing the episode summary for the respective activity episode comprises:
generating, by the computing system, one or more intermediate extractions for the respective activity episode, wherein each of the one or more intermediate extractions is an instance of the tuple associated with the conversational activity type associated with the respective activity episode,
wherein, for each respective intermediate extraction of the one or more intermediate extractions for the respective activity episode, generating the respective intermediate extraction comprises assembling, by the computing system, utterance features from among the utterance features associated with the respective activity episode into tuple components of a tuple of the respective intermediate extraction; and
using, by the computing system, a tuple of a particular intermediate extraction of the one or more intermediate extractions for the respective activity episode to populate the episode summary for the respective activity episode.

6. The method of claim 5, wherein:
the one or more intermediate extractions include a plurality of intermediate extractions for the respective activity episode, and
producing the episode summary for the respective activity episode further comprises:
after generating the plurality of intermediate extractions for the respective activity episode, performing, by the computing system, a pairwise similarity comparison of the intermediate extractions for the respective activity episode;
assigning, by the computing system, based on the pairwise similarity comparison, numerical weightings to the intermediate extractions for the respective activity episode; and
selecting, by the computing system, based on the numerical weightings assigned to the intermediate extractions for the respective activity episode, the particular intermediate extraction from among the plurality of intermediate extractions for the respective activity episode.

7. The method of claim 5, wherein:
the one or more intermediate extractions includes a plurality of intermediate extractions for the respective activity episode, and
producing the episode summary for the respective activity episode further comprises using, by the computing system, tuples of one or more of the intermediate extractions other than the particular intermediate extraction to supplement the episode summary for the respective activity episode.

8. The method of claim 1, further comprising, for each of the activity episodes:
selecting, by the computing system, a set of utterances to characterize content of the activity episode; and
presenting, by the computing system, the selected set of utterances to a user in addition to the episode summary for the activity episode.

9. A computing system for automatically generating abstractive summaries of meetings, the computing system comprising:
a memory configured to store a transcript of a meeting; and
one or more processing circuits configured to:
produce, based on the transcript of the meeting, a data structure that comprises utterance features;
determine, based on the transcript of the meeting, temporal bounds of a plurality of activity episodes within the meeting, wherein for each respective activity episode of the plurality of activity episodes, the temporal bounds of the respective activity episode indicate a start time and an end time of the respective activity episode and the utterance features include at least one utterance feature associated with the respective activity episode;
generate a plurality of episode summaries, wherein the one or more processing circuits are configured such that, as part of generating the plurality of episode summaries the one or more processing circuits, for each respective activity episode of the plurality of activity episodes:
determine, based on the utterance features associated with the respective activity episode, a conversational activity type associated with the respective activity episode; and
produce an episode summary for the respective activity episode that is dependent on the determined conversational activity type associated with the respective activity episode, the episode summary for the respective activity episode summarizing a conversational activity that occurred during the respective activity episode; and
combine the plurality of episode summaries to generate a summary of the meeting.

10. The computing system of claim 9, wherein the one or more processors are configured such that, as part of determining the utterance features, the one or more processors determine at least one of:
references to tasks;
references to conversation participants;
references to future dates;
features that describe an utterance in terms of grammatical tense-aspect-mood; or
agreement-oriented speech acts.

11. The computing system of claim 9, wherein two or more of the activity episodes are associated with different conversational activity types and overlap temporally.

12. The computing system of claim 9, wherein:
the one or more processors are configured such that, as part of determining the conversational activity type associated with the respective activity episode, the one or more processors select the conversational activity type associated with the respective activity episode from among a predefined plurality of conversational activity types, and
each conversational activity type of the predefined plurality of conversational activity types corresponds to a different type of activity capable of being performed by participants of the meeting by conversing.

13. The computing system of claim 12, wherein:
each respective conversational activity type of the predefined plurality of conversational activity types is associated with a respective tuple that includes a plurality of elements different from pluralities of elements of tuples associated with other conversational activity types of the predefined plurality of conversational activity types; and
for each respective activity episode of the plurality of activity episodes, the one or more processors are configured such that, as part of producing the episode summary for the respective activity episode, the one or more processing circuits:
generate one or more intermediate extractions for the respective activity episode, wherein each of the one or more intermediate extractions is an instance of the tuple associated with the conversational activity type associated with the respective activity episode,
wherein, for each respective intermediate extraction of the one or more intermediate extractions for the respective activity episode, the one or more processing circuits are configured such that, as part of generating the respective intermediate extraction, the one or more processing circuits assemble utterance features from among the utterance features associated with the respective activity episode into tuple components of a tuple of the respective intermediate extraction; and
use a tuple of a particular intermediate extraction of the one or more intermediate extractions for the respective activity episode to populate the episode summary for the respective activity episode.

14. The computing system of claim 13, wherein:
the one or more intermediate extractions include a plurality of intermediate extractions for the respective activity episode, and
the one or more processing circuits are configured such that, as part of producing the episode summary for the respective activity episode, the one or more processors:
after generating the plurality of intermediate extractions for the respective activity episode, perform a pairwise similarity comparison of the intermediate extractions for the respective activity episode;
assign, based on the pairwise similarity comparison, numerical weightings to the intermediate extractions for the respective activity episode; and
select, based on the numerical weightings assigned to the intermediate extractions for the respective activity episode, the particular intermediate extraction from among the plurality of intermediate extractions for the respective activity episode.

15. The computing system of claim 13, wherein:
the one or more intermediate extractions include a plurality of intermediate extractions for the respective activity episode, and
the one or more processing circuits are configured such that, as part of producing the episode summary for the respective activity episode, the one or more processing circuits further use tuples of one or more of the intermediate extractions other than the particular intermediate extraction to supplement the episode summary for the respective activity episode.

16. The computing system of claim 9, wherein, for each of the activity episodes, the one or more processing circuits are configured to:
select a set of utterances to characterize content of the activity episode; and
present the selected set of utterances to a user in addition to the episode summary for the activity episode.

17. A non-transitory computer-readable medium comprising instructions, wherein execution of the instructions causes one or more processing circuits of a computing system to perform operations comprising:
obtaining a transcript of a meeting;
producing, based on the transcript of the meeting, a data structure that comprises utterance features;
determining, based on the transcript of the meeting, temporal bounds of a plurality of activity episodes within the meeting, wherein for each respective activity episode of the plurality of activity episodes, the temporal bounds of the respective activity episode indicate a start time and an end time of the respective activity episode and the utterance features include at least one utterance feature associated with the respective activity episode;
generating a plurality of episode summaries, wherein generating the plurality of episode summaries comprises, for each respective activity episode of the plurality of activity episodes:
determining, based on the utterance features associated with the respective activity episode, a conversational activity type associated with the respective activity episode; and
producing an episode summary for the respective activity episode that is dependent on the determined conversational activity type associated with the respective activity episode, the episode summary for the respective activity episode summarizing a conversational activity that occurred during the respective activity episode; and
combining the plurality of episode summaries to generate a summary of the meeting.

18. The non-transitory computer-readable medium of claim 17, wherein:
determining the conversational activity type associated with the respective activity episode comprises selecting the conversational activity type associated with the respective activity episode from among a predefined plurality of conversational activity types, and
each conversational activity type of the predefined plurality of conversational activity types corresponds to a different type of activity capable of being performed by participants of the meeting by conversing.

19. The non-transitory computer-readable medium of claim 18, wherein:
each respective conversational activity type of the predefined plurality of conversational activity types is associated with a respective tuple that includes a plurality of elements different from pluralities of elements of tuples associated with other conversational activity types of the predefined plurality of conversational activity types; and for each respective activity episode of the plurality of activity episodes, producing the episode summary for the respective activity episode comprises:

generating one or more intermediate extractions for the respective activity episode, wherein each of the one or more intermediate extractions is an instance of the tuple associated with the conversational activity type associated with the respective activity episode, wherein, for each respective intermediate extraction of the one or more intermediate extractions for the respective activity episode, generating the respective intermediate extraction comprises assembling utterance features from among the utterance features associated with the respective activity episode into tuple components of a tuple of the respective intermediate extraction; and using a tuple of a particular intermediate extraction of the one or more intermediate extractions for the respective activity episode to populate the episode summary for the respective activity episode.

20. The non-transitory computer-readable medium of claim 19, wherein:

the one or more intermediate extractions include a plurality of intermediate extractions for the respective activity episode, and producing the episode summary for the respective activity episode further comprises:

after generating the plurality of intermediate extractions for the respective activity episode, performing a pairwise similarity comparison of the intermediate extractions for the respective activity episode;

assigning, based on the pairwise similarity comparison, numerical weightings to the intermediate extractions for the respective activity episode; and selecting, based on the numerical weightings assigned to the intermediate extractions for the respective activity episode, the particular intermediate extraction from among the plurality of intermediate extractions for the respective activity episode.

\* \* \* \* \*